(12) United States Patent
Gonoe

(10) Patent No.: US 7,726,532 B2
(45) Date of Patent: Jun. 1, 2010

(54) METHOD AND APPARATUS FOR FORMING CRACKS

(75) Inventor: Togo Gonoe, Osaka (JP)

(73) Assignee: Mitsuboshi Diamond Industrial Co., Ltd., Suita (JP)

( * ) Notice: Subject to any disclaimer, the term of this patent is extended or adjusted under 35 U.S.C. 154(b) by 315 days.

(21) Appl. No.: 11/575,589

(22) PCT Filed: Oct. 25, 2005

(86) PCT No.: PCT/JP2005/019533

§ 371 (c)(1),
(2), (4) Date: Mar. 20, 2007

(87) PCT Pub. No.: WO2006/046525

PCT Pub. Date: May 4, 2006

(65) Prior Publication Data

US 2007/0228100 A1 Oct. 4, 2007

(30) Foreign Application Priority Data

Oct. 25, 2004 (JP) ............................. 2004-309958

(51) Int. Cl.
B26F 3/00 (2006.01)
(52) U.S. Cl. ................................ 225/1; 225/5; 225/93.5
(58) Field of Classification Search ............ 219/121.72, 219/121.67; 225/93.5, 97, 96.5, 1, 4, 5; 438/458, 461–463
See application file for complete search history.

(56) References Cited

U.S. PATENT DOCUMENTS 3,453,097 A * 7/1969 Hafner ........................ 65/112
5,609,284 A * 3/1997 Kondratenko ................... 225/1
5,826,772 A * 10/1998 Ariglio et al. ................... 225/2
5,968,382 A * 10/1999 Matsumoto et al. ..... 219/121.72
5,984,159 A * 11/1999 Ostendarp et al. .......... 225/93.5
6,112,967 A * 9/2000 Ostendarp et al. .......... 225/93.5
6,713,720 B2 * 3/2004 Jeon et al. ............... 219/121.72
6,723,952 B2 * 4/2004 Choo et al. ............. 219/121.72

(Continued)

FOREIGN PATENT DOCUMENTS

JP 06-002597 1/1994

(Continued)

Primary Examiner—Boyer D Ashley
Assistant Examiner—Omar Flores-Sanchez
(74) Attorney, Agent, or Firm—Antonelli, Terry, Stout & Kraus, LLP.

(57) ABSTRACT

A method for forming a crack which can precisely form a crack in a desired direction in substrates made of brittle materials even if the substrate of a large size is placed apart from a correct reference position on the scribe table.

According to this method, a crack formation presumed line M is formed following the position separated from a beam travel line L, which is the track of the movement of the center of the beam spot B, by an offset amount O by moving a beam spot B relatively to a substrate G so that the beam travel line L can be in an oblique direction to a reference axis direction X set so as to be coincident with the substantial major axis direction of the beam spot B, and further a cooling spot C is relatively moved following the crack formation presumed line M, and thereby a vertical crack is formed following the crack formation presumed line M.

9 Claims, 11 Drawing Sheets

U.S. PATENT DOCUMENTS

| | | | |
|---|---|---|---|
| 6,811,069 B2 * | 11/2004 | Hauer et al. | 225/93.5 |
| 6,812,430 B2 * | 11/2004 | Kang et al. | 219/121.72 |
| 7,014,082 B2 * | 3/2006 | Hauer et al. | 225/93.5 |

FOREIGN PATENT DOCUMENTS

| | | |
|---|---|---|
| JP | 11-021141 | 1/1999 |
| JP | 2001-130921 | 5/2001 |
| KR | 2001 0063794 | 7/2001 |
| WO | WO 93/20015 | 10/1993 |
| WO | WO 01/34529 | 5/2001 |
| WO | WO 2004/014625 | 2/2004 |

* cited by examiner

Fig.3

| Inclination Angle θ [Degree-Minute] | Offset Amount [μm] | Output [W] | Distance (X direction) between Beam Spot and Cooling Spot[mm] | Distance (Y direction) between Beam Spot and Cooling Spot[mm] |
|---|---|---|---|---|
| 0° 06 ⟨⟩ | 50 | 130 | 30 ↓ | 25 ↓ |
| | | 160 | | 28 ↓ |
| | | 190 | ↓ | 27 ↓ |
| 0° 11 ⟨⟩ | 100 | 130 | 30 | 49 ↓ |
| | | 160 | | 56 ↓ |
| | | 190 | ↓ | 54 ↓ |
| 0° 17 ⟨⟩ | 150 | 130 | 30 | 75 ↓ |
| | | 160 | | 83 ↓ |
| | | 190 | ↓ | 80 ↓ |
| 0° 23 ⟨⟩ | 200 | 130 | 30 | 105 ↓ |
| | | 160 | | 111 ↓ |
| | | 190 | ↓ | 107 ↓ |

(a)

(b)

METHOD AND APPARATUS FOR FORMING CRACKS

FIELD OF THE INVENTION

The present invention relates to a method and apparatus for forming cracks in substrates made of glass, sintered ceramic, single-crystal silicon, sapphire, semiconductor wafer, ceramic and other brittle materials to scribe and break the same, and more particularly to a method and apparatus for forming cracks in such substrates by irradiating a laser beam thereto.

BACKGROUND OF THE ART

Conventionally, a substrate-scribing and breaking method has been used for substrates made of glass and other brittle materials in which a mechanical processing means, such as cutter wheel, is used to form a scribe line on the surface of a substrate and then break the scribed substrate by bending the same in such a way that this scribe line facilitates the development of a crack.

Recently, however, in substitution for such a mechanical scribing and breaking method, a substrate scribing and breaking method has been practically applied by irradiating a laser beam to a substrate and thereby forming a vertical crack in the substrate (as disclosed in Patent Document 1).

FIG. 8 is a schematic view depicting the operation of a conventional crack-forming apparatus. According to a crack-forming method using a laser beam as shown in FIG. 8, while a spot beam is irradiated from a laser irradiation unit 102 to a substrate 101 to form an oval beam spot B (laser beam irradiated area), a jet of refrigerant is emitted from a refrigerant nozzle 103 to form a cooling spot (refrigerant emitted area) C.

The substrate 101 is moved in such a direction as being cut out (as shown by arrows in FIG. 8) and the beam spot B is moved relatively to the substrate 101. At this time, the major axis direction of the beam spot B is so arranged as to coincide with the moving direction of the substrate 101. On the other hand, the cooling spot C is so arranged as to be on the continuation of the major axis direction of the beam spot B and at the same time emit a jet of refrigerant to a position behind the beam spot B.

When the oval beam spot B moves in the major axis direction thereof, the area through which the beam spot B passes is continuously heated as long as the beam spot B is passing therethrough at a temperature under the melting point of the substrate, and compressive stress is generated within and around the heated area.

Immediately after the beam spot B heats the area, the cooling spot C passes through the area. As a result, a cooled area is generated adjacent the heated area where the compressive stress was generated and tensile stress is generated around the cooled area. Then, based on difference between the compressive stress and the tensile stress, a vertical crack is vertically formed in the surface of the substrate along the passage of the beam spot B and cooling spot.

Patent Document 1: Japanese Unexamined Patent Publication No. 2001-130921

DISCLOSURE OF THE INVENTION

Problems to be Solved by the Invention

According to the crack-forming method using a laser beam as described above, the beam spot is shaped to be elongated in one direction as seen in oval, for example, with the definable major axis direction.

As shown in FIG. 9, it is so arranged that when the beam spot B moves on the substrate, the major axis direction of the beam spot B and the moving direction of the beam spot B (where the moving direction of the major axis center of the beam spot B is referred to as the "moving direction of the beam sport B") be able to coincide with each other, heating efficiency can be raised by extending the total laser beam irradiation time at each point through which the beam spot B passes, and heating can be sufficiently achieved at the temperature under the melting point of the substrate even if the moving speed of the laser beam is accelerated as much as possible.

As described above, when the moving direction of the beam spot B and the major axis direction of the beam sport B coincide with each other and at the same time the cooling spot C is positioned on the posterior continuation of the major axis direction of the beam spot B, a crack due to stress difference between the compressive stress and the tensile stress can be formed below the same axis line as the major axis direction of the beam spot B.

Therefore, in this arrangement, the substrate intended for crack formation is set with the desired direction of the substrate precisely coincident with the major axis of the beam spot B, and then the beam spot B is moved so that a crack can be formed in the desired direction.

Here, it should be noted that when the beam spot B having the major axis direction is used for heating, the position of the highest temperature reaching point in a temperature distribution by the beam spot B (heated area) differs between a case where the beam spot B is at a stop and a case where the beam spot B is moving.

FIG. 10 is a schematic view depicting the position of the highest temperature reaching point by a beam spot at a stop (FIG. 10(*a*)) and a beam spot on the move (FIG. 10(*b*)). For example, in the case where a laser beam having a temperature distribution with the highest temperature point P in the center of the beam spot B (Gaussian distribution) as shown in FIG. 10(*a*) when the beam spot B is at a stop is used, and when the beam spot B moves in the major axis direction thereof, the highest temperature reaching point P in the substrate by the beam spot B on the move, shifts in the posterior direction under the influence of time lag due to thermal relaxation as shown in FIG. 10(*b*).

This shift amount of the highest temperature reaching point P from the center of the beam spot B is determined by the mode (distribution mode) of the laser beam.

For instance, when the mode of the used laser beam is Gaussian distribution, the highest temperature reaching point P shifts from the center of the heat source (center of the beam spot B). It is considered that this shift amount is maintained to be substantially constant within the ordinary moving speed area of the beam spot B (100 mm/s or more) used for laser scribe operation.

As long as the substrate is set in such a way that the major axis direction of the beam spot B and the moving direction of the beam spot B coincide with each other, the existence of the shift of the highest temperature reaching point P in the substrate due to the movement of this beam spot B is not particularly problematic and therefore requires no special attention.

Recently, however, there has been a trend toward the upsizing of mother substrates (hereinafter referred to as "M-substrate" or merely "substrate") from which unit substrates are cut out, and therefore, it has been desired that a scribe line having a high straightforwardness and high cross-section quality after scribing and breaking can, be formed with a high precision in the desired direction on the large-sized substrates such as M-substrates.

However, the larger the substrate becomes, the harder the handling for setting precisely the M-substrate on the scribe table becomes. Even if small positional deviation is caused to one end of the large-sized substrate and however small such positional deviation is, the positional deviation will be larger at the other end of the substrate. As a result, it will be difficult to precisely set the position and direction of the substrate on the scribe table, and the setting precision of the substrate will be degraded all anyhow. It is difficult to make the major axis direction of the beam spot agree to the scribing direction. These make it difficult to have the major axis direction of the beam spot B and the moving direction of the beam spot B coincident with each other before forming a crack.

In order for the large-sized M-substrate to be set highly precisely in terms of position, an expensive substrate mounter equipped with a high-precision positioning mechanism is required, Furthermore, when it is required to correct the positioning of the M-substrate mounted on a scribe table, since it is difficult to precisely set the M-substrate in the correct position and direction, it not only wastes time but also causes unnecessary stress or damage to the M-substrate.

Under the circumstances, the first object of the present invention is to provide a method and an apparatus for forming a vertical crack with guaranteed high cross-section quality in the desired direction with a high precision even if it is difficult to secure the high positioning precision due to the upsizing of the M-substrate.

On the other hand, when a mechanism for adjusting the moving direction of the beam spot B according to a positional error caused in setting the M-substrate as if compensating for such positional error, i.e., a two-dimensional drive mechanism (X-Y stage), is used, the moving direction of the center of the beam spot B and the major axis direction of the beam spot B (the reference axis direction) cannot be coincident with each other.

If the center of the beam spot B moves in a direction different from the major axis direction of the beam spot B (the reference axis direction), since the major axis center of the beam spot B and the highest temperature reaching point P of the beam spot B will not be coincident with each other under the influence of time lag due to thermal relaxation for the beam spot B on the move, the track of movement of the major axis center movement of the beam spot B (referred to as "beam travel line") and the track of the highest temperature reaching point P of the beam spot B will follow lines different from each other.

The above will be explained by referring to drawings. FIG. 11 is a schematic view depicting the measurement and interpolation of positional deviation of an alignment marks marked inside a substrate. A case shown in FIG. 11 is supposed where alignment marks P and Q for positioning are formed at two different locations, respectively, separated from each other, a crack is formed following the straight line connecting these two alignment marks P and Q, and the M-substrate is broken along the crack.

Here, it is assumed that the major axis direction (referred to as "reference axis direction") of the beam spot B is precisely set in the X-axis direction of the apparatus.

Conventionally, the substrate direction has been adjusted (by turning) until both the two alignment marks P and Q come to be aligned on the X-axis.

However, with the increase in the substrate size, it has become difficult to fine-adjust the M-substrate position and precisely position the M-substrate on the scribe table. To cope with this difficulty, the moving direction of the beam spot B was so arranged as to be able to move not only in the reference axis direction (X-axis direction) but also in the Y-axis direction vertical to the X-axis. By making the beam spot B movable within the X-Y plane (i.e., also including an oblong direction to the reference axis (X-axis)), linear interpolation can be applied to the Y-axis direction, and also by making the beam spot B movable in an oblong direction to the reference axis (X-axis), forming a crack was tried in an oblong direction.

For instance, in a case when a glass scriber scribing with a cutter wheel tip, it is known to make a direction of the movement of the glass cutter (direction of scribing) coincident with a desired scribing direction in an M-substrate instead of turning the table on which the M-substrate is put when a desired scribing direction in the M-substrate shifts from a reference line of the table (Japanese Examined Patent Publication No. 1994-2597).

On the other hand, in a case of a scriber scribing by a laser beam forming a beam spot having a major axis, because it is difficult to make a direction of the major axis of the beam spot coincide with a desired scribing direction in a M-substrate in every case when the desired scribing direction in the M-substrate shifts from a reference line of the scribe table, the crack is not able to be formed in the desired direction only by moving the beam spot along the desired scribing direction.

FIG. 12 is a schematic view depicting the movement state of a beam spot for a case of a beam spot having the major axis direction. In this case, as shown in FIG. 12, the beam spot B of an oval shape moves in an oblong direction with both the end in parallel. When looked the entirety of the beam spot B, the beam spot B passes through an area H of parallelogram. The highest temperature reaching point P by the beam spot B on the move in relation to a beam travel line L, which is the track of the movement of the major axis center of the beam spot B, shifts in the posterior direction of the major axis center of the beam spot B under the influence of time lag due to thermal relaxation, and a track M of the actual highest temperature reaching point P shifts in the posterior direction of and in parallel with the beam travel line L.

On the other hand, the cooling spot C positioned on the posterior continuation of the major axis direction (reference axis direction) of the beam spot B passes through a track N, which is in parallel with the beam travel line L.

After all, the track M of the highest temperature reaching point P passes following a third line different from the beam travel line L or the track N of the cooling spot C.

The track M of the highest temperature reaching point P is a track subjected to the most intensive heating and a large thermal strain, in which a crack is most likely to be formed by the subsequent cooling. In a precise sense, the position of crack formation slightly varies according to the position of the cooling spot C. Therefore, since a crack can be formed following this line or in the vicinity thereof as long as the subsequent cooling is properly applied by the cooling spot C, the track M of the highest temperature reaching point P (or a track in the vicinity of the highest temperature reaching point P) is taken as a crack formation presumed line M.

The distance between the beam travel line L and the crack formation presumed line M (hereinafter referred to as an offset distance 0) is determined depending on the angle of inclination θ between the major axis direction of the beam spot B and the beam travel line L and the distance between the beams spot B and the cooling spot C.

FIG. 13 explains the positional relation among the beam travel line L, the crack formation presumed line M and the track M of the cooling spot C when the reference axis direction (X-axis direction, the major axis of the beam spot B) is laid in the right horizontal direction. As seen in this figure, the crack formation presumed line M is out of alignment not only from the beam travel line L by the offset amount (offset distance) O, but also the track N of the cooling spot C. As a result, the position where compressive stress is generated by heating and the position where tensile stress is generated by cooling are separated from each other, a crack to be formed based on stress difference is not always formed following the crack formation resumed line M as presumed, and a vertical crack cannot be formed in the desired direction.

In view of this, the second object of the present invention is to provide a method and an apparatus for forming a crack in the desired position and direction (the position separated from the beam travel line L by the offset amount) when it is tried to form a crack by relatively moving the substrate so that the beam travel line L can be in an oblique direction to the major axis direction (reference axis direction) of the beam spot B.

Furthermore, the condition of crack formation is different between the center part of the M-substrate and the edge part of the substrate. Specifically, heat evenly diffuses in the center part of the M-substrate, but heat unevenly diffuses at the edge part of the substrate, such as the break start point (inlet part) and break end point (outlet part). In addition, since the beam spot B has the major axis direction and the cooling spot C is positioned behind the beam spot B in the major axis direction of the beam spot B, heat input amount due to heating and heat output amount due to cooling are different between the center part of the substrate and the edge part of the substrate.

When the major axis direction of the beam spot B and the moving direction of the beam spot B (beam travel line L) are coincident with each other as shown in FIGS. 8 and 9, the difference in heat diffusion between the center part of the M-substrate and the edge part of the M-substrate is not so problematic. However, when the crack formation presumed line M is deviated from the beam travel line L by setting the beam travel line L in an oblique direction to the major axis direction (reference axis direction) of the beam spot B, a curved crack called "flare" or a defect called "hasty cutting" is caused due to the difference in heat diffusion or the like between the center part of the M-substrate and the edge part of the M-substrate.

FIG. 16 is a schematic view depicting "flare" caused when a crack is being formed in a substrate. Here, the "flare" refers to a phenomenon as exemplified in FIG. 16 that a crack K vertically developed from a scribe line formed on a substrate G in the horizontal direction further develops in an oblique direction from a position γ in the vicinity of the back side of the substrate G and reaches the back side of the substrate G. Since the "flare" spoils the flatness or squareness of the break surface of the substrate G, the quality of the break surface is degraded.

FIG. 17 is a schematic view depicting "hasty cutting" caused when a crack is being formed in a substrate. The "hasty cutting" refers to a phenomenon that a horizontal crack CR is formed in the vicinity of a scribe start point at the edge part of a substrate G in a direction that cannot be controlled ahead of a laser spot LS from the front edge of a scribe line heated by the laser spot LS as exemplified in FIG. 17(a) or a horizontal crack CR is formed in the vicinity of a scribe end point of the edge part of the substrate G from the edge part of the substrate G toward a laser spot LS, i.e., in a direction that cannot be controlled oppositely from the moving direction of the laser spot LS as exemplified in FIG. 17(b). Since a scribe line is formed in a position on the substrate G deviated from the scribe formation presumed line M due to the "hasty cutting", the straightforwardness is spoiled to a notable degree.

For example, when it is so arranged that a trigger serving as a crack initiator is formed at the substrate edge on the beam travel line L of the break start point (inlet part) to make a crack always start growing from the trigger and the beam spot B and the cooling spot C move in the positional relation as shown in FIG. 13, curved cracks U and V called "flares" are generated due to the difference in heat diffusion and the difference between heat input amount and output amount as shown in FIG. 14.

In view of this, the third object of the present invention is to provide a method and apparatus for forming a crack free from any defect such as "flare" or "hasty cutting,", even if, when the beam spot is moved relatively to the M-substrate, the beam travel line L is in an oblique direction to the major axis direction of the beam spot B (reference axis direction).

MEANS FOR SOLVING THE PROBLEMS

According to the crack-forming method of the present invention aiming at solving the above problems, a laser beam forming a beam spot substantially having the major axis is irradiated to a substrate made of a brittle material, a cooling spot is formed on the substrate by the emission of a jet of refrigerant, and thereby thermal strain is locally caused to the substrate by heating with the irradiation of the laser beam and by cooling by means of the cooling spot, and as a result, a vertical crack is formed in the substrate. In this arrangement, the beam spot is moved relatively to the substrate so that a beam travel line, which is the track of the major axis center of the beam spot moving in an oblique direction to the reference axis direction fixed to be coincident with the major axis direction of the beam spot and the cooling spot is moved relatively to the substrate following the position separated from the beam travel line by an offset amount (crack formation presumed line), and thereby a crack is formed following the crack formation presumed line.

It should be noted here that the cooling spot is relatively moved "following the crack formation presumed line" in the above description, but the relative movement of the cooling spot should not be limited to be on the crack formation presumed line but the cooling spot may be moved in parallel with the crack formation presumed line. The center position of the cooling spot may be separated from, for example, the crack formation presumed line as long as the distance remains within several mm from.

According to the crack-forming method of the present invention, a laser beam forming a beam spot substantially having the major axis is irradiated to the substrate made of a brittle material. As a beam spot substantially having the major axis, although a beam spot of oval (ellipse) shape is suitable, any beam spot that can allow the substantial definition of the major axis direction in comparison with the other directions, such as a plurality of circular beam spots arranged in series at small intervals or arranged on both sides of a crack formation presumed line therebetween. The major axis of a beam spot may be roughly 10 to 30 mm in length. The major axis direction of a beam spot is defined for convenience in determining the movement direction of a beam spot as the reference axis direction.

Forming a crack according to the present invention refers to forming a beam spot by irradiating a laser beam (laser heating), forming a cooling spot (quenching), forming a crack (becomes invisible after a certain time from formation and therefore called as "blind crack") by using the difference in stress caused by the laser heating and the quenching, developing the formed crack in the substrate thickness direction, moving the beam spot and the cooling spot on the substrate relatively to the substrate, and thereby leading the crack developed in the substrate thickness direction in the horizontal direction, and therefore forming a scribe line (including a case where the substrate is completely broken (full-body cut)).

A beam spot is moved in such a way that the track of the major axis center of the beam spot (beam travel line) can be in an oblique direction to the reference axis direction. Namely, the beam spot is moved relatively to the substrate not only in the X-axis direction (the reference axis direction) but also in the Y-axis direction. In this arrangement, the track of the highest temperature reaching point formed by the movement of the beam spot under the influence of time lag due to thermal relaxation passes through a line which is different from the beam travel line. That is, the track of the highest temperature reaching point of the beam spot passes through a position separated from the beam travel line by a finite distance (offset amount). The offset amount may be, for example, several mm.

A vertical crack is formed following this track of the highest temperature reaching point (crack formation presumed line). For example, when it is so arranged that the cooling spot relatively moves following the crack formation presumed line, the position where compressive stress is generated by heating and the position where tensile stress is generated by cooling are coincident with each other, and thereby, a vertical crack can be formed following the track of the highest temperature reaching point (crack formation presumed line) by using the difference in stress.

The temperature distribution on the surface of the substrate may be measured (for instance, in non-contact with the infrared rays thermometer) when the laser beam is moving and positional data of the highest temperature reaching point may be obtained, and laser scribing may be conducted with changing the position of the cooling spot. When a positional control of the cooling spot by such a continuous measurement is difficult to be used because of large amount of money of the temperature measuring instrument, the temperature measurement data at the scribing last time may be used.

EFFECTS OF THE INVENTION

According to the above crack-forming method, the first object of the present invention can be solved. Specifically, even if the substrate is so upsized that the substrate can no longer be precisely positioned with respect to the reference axis direction which is requested to be coincident with the major axis direction of the beam spot (to be agree to the crack formation presumed line), a vertical crack can be formed in any desired direction (the same direction with the crack formation presumed line) other than the reference axis direction by inclining the beam travel line to the reference axis direction.

Also, according to the above crack-forming method, the second object of the present invention can be solved. Specifically, even if a crack is formed by relatively moving the substrate in an oblique direction to the major axis direction (reference axis direction) of the beam spot, a vertical crack can be precisely formed following the crack formation presumed line by relatively moving the cooling spot following the crack formation presumed line.

Other Means for Solving Problems and Effects of the Means

In the above crack-forming method, it is preferable that the crack formation presumed line should be on the track of movement of the highest temperature reaching point formed by the beam spot. In this case, since the line with the largest thermal strain caused by the laser beam heating is the crack formation presumed line, a vertical crack can be formed along the crack formation presumed line most easily and precisely.

Also, in the above crack-forming method, when the beam spot is moved relatively to the substrate, the angle of inclination between the reference axis and the beam travel line is obtained by arithmetic operation, and the offset amount is determined by using at least the above angle of inclination as one of the parameters, and thereby the position of the crack formation presumed line is estimated and the position of the cooling spot may be set so that the cooling spot can be relatively moved following the estimated crack formation presumed line or in the vicinity (e.g., within several mm) of the estimated crack formation presumed line.

The offset amount is dependent on the angle of inclination between the reference axis direction and the beam travel line. Therefore, for example, when the substrate is set, even if the reference axis direction and the beam travel line direction fail to be coincident with each other, the angle of inclination of the substrate is obtained and then the offset amount can be obtained based on this angle of inclination, and thereby the crack formation presumed line can be estimated based on this offset amount.

Therefore, by moving the cooling spot following the estimated crack formation presumed line or in the vicinity of the estimated crack formation presumed line, a vertical crack can be precisely formed following the estimated crack formation presumed line or in the vicinity of the estimated crack formation presumed line.

Also, in the above crack-forming method, in addition to the above angle of inclination, the distance between the beam spot and the cooling spot may be used as one of the parameters. The distance (distance on the line on which the cooling spot moves on the substrate) between the beam spot and the cooling spot may be, for example, 0-50 mm, though it depends on the length of the major axis of the beam spot. Since the offset amount is dependent not only on the angle of inclination but also on the distance between the beam spot and the cooling spot, when a crack is formed by varying the distance between the beam spot and the cooling spot, the crack formation presumed line can be estimated more precisely, if the crack formation presume line is estimated based on this parameter.

When a scribe table equipped with a mechanism for moving in the X-axis direction and Y-axis direction is used, the above distance between the beam spot and the cooling spot is expressed by the distance in the X-axis direction and distance in the Y-axis direction on the substrate mounting surface of the table.

Also, in the above crack-forming method, when it is so arranged that the cooling spot is varied in the vertical direction to the beam travel line when setting the cooling spot, the obtained offset amount can be used as it is as the distance to be positionally varied.

Also, in the above crack-forming method, it may be so arranged when starting the crack formation at the substrate edge that a trigger is formed as the crack start point beforehand at the substrate edge on the crack formation presumed line and then the beam spot is moved relatively to the substrate.

According to this arrangement, the third object of the present invention can also be solved. Specifically, when a trigger is formed below the crack formation presumed line, the position where a crack is formed at one end of the start point of the crack formation presumed line are coincident with each other almost completely, and therefore there is no occurrence of any defect, such as "flare" and "hasty cutting."

Also, in the above crack-forming method, it may be so arranged that a substrate mounting unit for mounting the substrate within a plane including the reference axis direction is used, the substrate on which alignment marks have been formed as navigation marks of the substrate position is mounted on the substrate mounting unit, the relative positions of the above alignment marks on the above substrate to the reference mounting position related to the above reference axis direction are detected, a linear interpolation value, which is the deviation amount of the substrate from the reference axis, is obtained by arithmetic operation based on the positions of the detected alignment marks, the direction of the beam travel line is determined based on the obtained linear interpolation value, the angle of inclination between the determined beam travel line direction and the above reference axis direction is obtained by arithmetic operation, and the offset amount is determined by using at least the above angle of inclination as one of the parameters, and thereby the position of the crack formation presumed line separated from the beam travel line by the offset amount is estimated, and the position of the cooling spot is set so that the cooling spot can be relatively moved following the estimated crack formation presumed line or in the vicinity of the estimated crack formation presumed line.

According to the above arrangement, the positional deviation amount, i.e., the linear interpolation value and the angle of inclination of the set substrate by using the alignment marks formed on the substrate, and thereby the beam travel line direction is determined. Then, by determining the offset amount based on the obtained angle of inclination, the crack formation presumed line is estimated in the position separated from the determined beam travel line by the offset amount. After this, the position of the cooling spot is determined so that the cooling spot can be moved following the estimated crack formation presumed line.

As described above, even if the substrate fails to have been precisely positioned, a vertical crack can be precisely formed following the estimated crack formation presumed line by determining the amount of the substrate from the alignment marks formed on the substrate and determining the beam travel line and the offset amount according to the determined positional deviation amount.

Also, a crack-forming apparatus according to the present invention invented to solve the above problems from different points of view comprises with a laser beam irradiation unit for irradiating a laser beam for forming a beam spot substantially having the major axis direction, a cooling unit for forming a cooling spot, a beam spot drive unit for moving the beam spot relatively to a substrate mounted on a substrate mounting unit, a cooling spot drive unit for moving the cooling spot relatively to the substrate, and a control unit for controlling each of the above units. This crack-forming apparatus forms a crack in the substrate by moving the beam spot and the cooling spot relatively to the substrate. The control unit controls the movement of the beam spot by the beam spot drive unit in such a way that the direction of the beam travel line, which is the track of the movement of the major axis center of the beam spot, can be in an oblique direction to the reference axis direction (in the same direction with the crack formation presumed line) set to be coincident with the virtual major axis direction of the beam spot. At this time, the control unit controls the movement of the cooling spot by the cooling spot drive unit in such a way that the cooling spot can be relatively moved following the crack formation presumed line formed in the position separated from the beam travel line by the offset amount.

According to this crack-forming apparatus, a beam spot substantially having the major axis direction is irradiated from the laser beam irradiation unit to the substrate made of a brittle material. This beam spot is so arranged as to be relatively moved on the substrate by the beam spot drive unit under the control thereof. The cooling spot is formed by the cooling unit on the substrate made of a brittle material, and thereby the substrate is locally cooled. This cooling spot is so arranged to be relatively moved along the crack formation assumed line on the substrate by the cooling spot drive unit.

The control unit controls the beam spot drive unit to move the beam spot in such a way that the direction of the beam travel line, which is the track of the movement of the major axis center of the beam spot, is in an oblique direction to the reference axis direction set to be coincident with the substantial major axis direction of the beam spot. This allows the highest temperature reaching point by the beam spot on the move to deviate from the beam travel line due to time lag caused by thermal relaxation, and the crack formation presumed line, which is the track of the highest temperature reaching point due to heating, is formed in a position separated from the beam travel line by a finite distance (offset amount). The control unit controls the cooling spot drive unit to move the cooling spot following the crack formation presumed line. This allows tensile stress to be generated as a result of cooling following the crack formation presumed line accompanied by the generation of compressive stress, and thereby forming a vertical crack based on stress difference.

In the above crack-forming apparatus, it may also be so arranged that an offset amount memory unit is further provided for storing the relation between the angle of inclination between the above reference axis direction and the above beam travel line direction and the offset amount, and the control unit determines the offset amount by using the angle of inclination made when moving the beam spot at least as one of the parameters and referring to the offset amount memory unit, estimates the crack formation presumed line based on the determined offset amount, and controls the movement of the cooling spot by the cooling spot drive unit in such a way that the cooling spot can move relatively to the substrate following the estimated crack formation presumed line or in the vicinity of the estimated crack formation presumed line.

According to the present invention, since the offset amount is dependent on the angle of inclination between the reference axis direction and the beam travel line, the relation between the angle of inclination between the above reference axis direction and beam travel line direction and the offset amount is obtained and stored in the offset amount memory unit beforehand. When the substrate is set but the reference axis direction and the beam travel line direction fail to be coincident with each other, the offset amount is determined according to the angle of inclination of the substrate and by referring to the offset amount memory unit. By determining the offset amount, the crack formation presumed line can be estimated in the position separated from the beam travel line by the offset amount.

Therefore, by moving the cooling spot by the cooling spot drive unit following the estimated crack formation presumed line or in the vicinity of the estimated crack formation presumed line, a vertical crack can be precisely formed following the crack formation presumed line or in the vicinity of the crack formation presumed line.

Also, in the above crack-forming apparatus, it may also be so arranged that the offset amount memory unit stores the relation of the offset amount with the above angle of inclination by using the distance between the beam spot and the cooling spot as one of the parameters, in addition to the above angle of inclination.

Since the offset amount is dependent not only on the angle of inclination but also on the distance between the beam spot and the cooling spot, when controlling the beam spot drive unit and the cooling spot drive unit by the control unit and forming a crack by varying the angle of inclination and the distance between the beam spot and the cooling spot, the relation of the distance between the beam spot and the cooling spot with the offset amount is stored together with the angle of inclination as parameters in the offset amount memory unit and the crack formation presumed line is estimated based on these parameters, and thereby the crack formation presumed line can be estimated more precisely.

Though the crack formation presumed line (a track of the highest temperature reaching point) may be presumed as stated above, it may be measured by obtaining positional data of the highest temperature reaching point by the laser spot. For instance, positional data of the highest temperature reaching point can be obtained by measuring the temperature distribution on the surface of the substrate when the laser beam is moving. For instance, the temperature distribution on the surface of the substrate can be measured by non-contact with use of an infrared rays thermometer.

Also, in the above crack-forming apparatus, it may also be so arranged that the beam spot drive unit and the cooling spot drive unit are composed integrally with each other so that the beam spot and the cooling spot can be interlocked with each other, a cooling spot position adjustment unit is further provided for adjusting the cooling spot relatively to the beam spot, and the control unit adjusts the position of the cooling spot relatively to the beam spot by using the cooling spot position adjustment unit according to the offset amount determined by referring to the offset amount memory unit (or according to the positional data of the highest temperature reaching point).

According to the above arrangement, the position of the cooling spot relative to the beam spot is adjusted by the cooling spot position adjustment unit, the beam spot drive unit and the cooling spot drive unit, which are composed integrally with each other, are operated, and thereby a linear crack can be easily formed.

In this case, when the cooling spot position adjustment unit adjusts the position of the cooling spot in the vertical direction to the beam travel line, the offset amount can be used as it is as the positional variation of the cooling spot position adjustment unit.

Also, in the above crack-forming apparatus, it may also be so arranged that a trigger formation unit for forming a trigger to be used as the start point of crack formation and a trigger position adjustment unit for adjusting the position of the trigger form unit are further provided and the control unit sets the position of the trigger formation unit at the substrate edge on the crack formation presumed line estimated beforehand when starting the crack formation at the edge of the substrate.

According to the above arrangement, a trigger is formed at one edge of the estimated crack formation presumed line, and therefore a crack can be formed following the crack formation presumed line without fail.

BRIEF EXPLANATION OF DRAWINGS

FIG. 3 is a table describing the contents stored in an offset memory unit to be used for a crack-forming apparatus according to another embodiment of the present invention;

| EXPLANATION OF NUMERALS | |
|---|---|
| 11 | chassis |
| 12 | slide table |
| 13 | ball screw |
| 14, 15 | guide rails |
| 16 | ball nut |
| 19 | pedestal |
| 21 | guide rail |
| 22 | ball screw |
| 23 | motors |
| 24 | ball nut |
| 26 | table |
| 31 | scribe head |
| 33 | optical holder |
| 34 | laser oscillator |
| 35 | lens optical system |

-continued

EXPLANATION OF NUMERALS

| | |
|---|---|
| 38, 39 | CCD cameras |
| 40 | cooling unit |
| 42 | nozzle |
| 43 | nozzle X-axis drive (adjustment) mechanism |
| 44 | nozzle Y-axis drive (adjustment) mechanism |
| 45 | trigger formation unit (cutter wheel) |
| 46 | trigger adjustment mechanism |
| 50 | control unit |
| 51 | laser irradiation control unit |
| 52 | refrigerant jet emission control unit |
| 53 | substrate position reading control unit |
| 54 | beam spot and cooling spot drive control unit |
| 55 | cooling spot position adjustment control unit |
| 57 | offset amount determination unit |
| 58 | crack formation presumed line estimation unit |
| 59 | trigger position adjustment control unit |
| 60 | scribe head up/down movement control unit |
| 62 | offset amount memory unit |

BEST MODE TO EMBODY THE INVENTION (Apparatus Composition)

In the following paragraphs, crack-forming methods and crack-forming apparatuses according to the present invention will be described by referring to the accompanying drawings.

Figure 1:
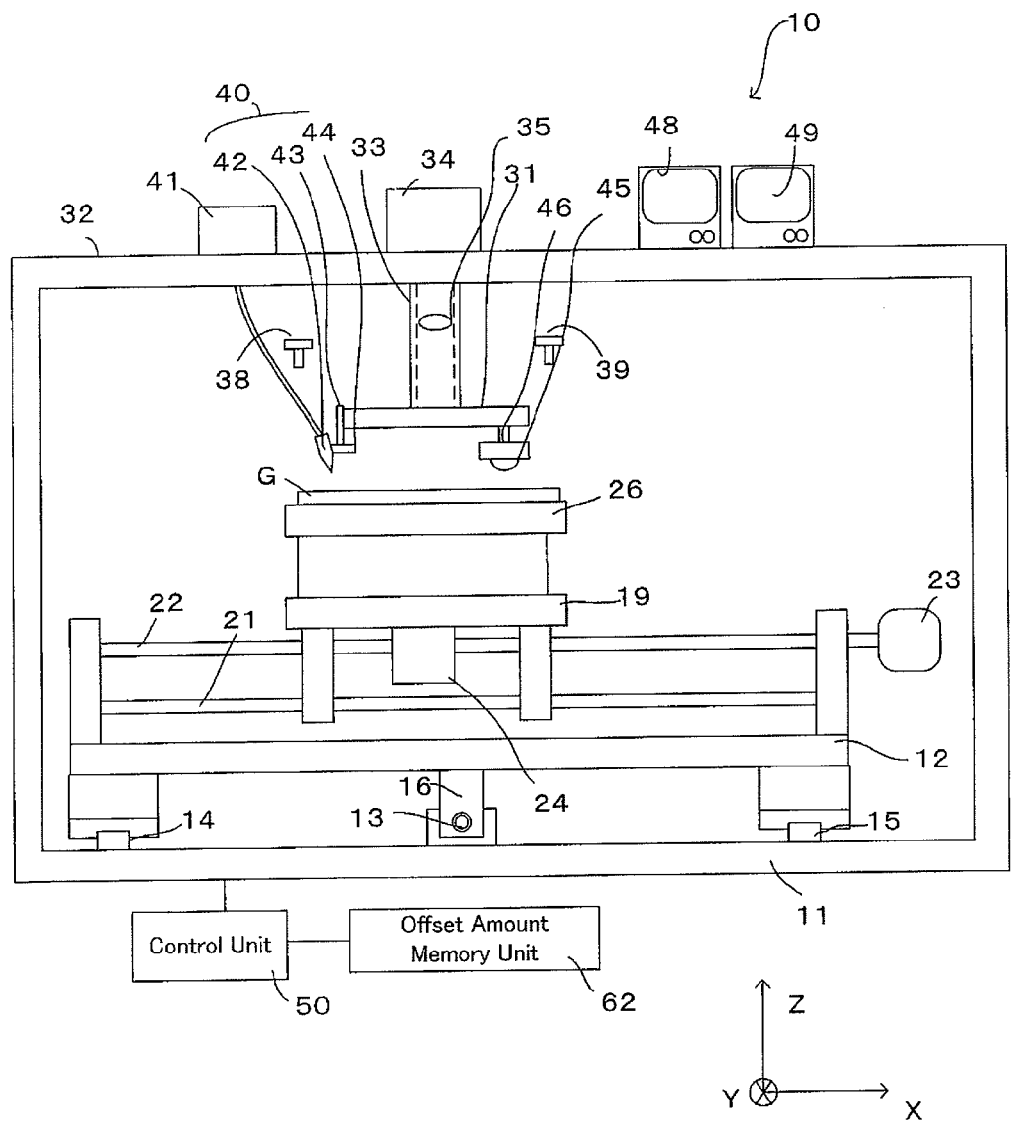
FIG. 1 is a schematic view illustrating a crack-forming apparatus according to an embodiment of the present invention.

FIG. 1 is a schematic view illustrating a crack-forming apparatus 10 according to an embodiment of the present invention. This crack-forming apparatus 10 is used for scribing and breaking a mother substrate into a plurality of substrates to be used for, for example, flat panel display (FPD).

This apparatus has a slide table 12 reciprocating in the Y-axis direction on a chassis 11 having a horizontal X-Y flat surface. This slide table 12 is supported by a pair of guide rails 14 and 15 arranged in parallel with each other in the Y-axis direction on the chassis 11 in the horizontal state and slidably along each of the guide rails 14 and 15. In the intermediate position between both the guide rails 14 and 15, a ball screw 13 is mounted rotatively by a motor (not illustrated). The ball screw 13 is rotatable in either direction, forward or reverse. On this ball screw 13, a ball nut 16 is threadably mounted.

The ball nut 16 is mounted non-rotatably and integrally on the slide table 12 so as to slide in either direction, forward or reverse, along the ball screw 13 when the ball screw 13 rotates forwardly or reversely. Accordingly, the slide table 12 mounted integrally with the ball nut 16 slides in the Y-axis direction along the guide rails 14 and 15. Therefore, these components compose a Y-axis drive mechanism.

On the slide table 12, a pedestal 19 is horizontally mounted. The pedestal 19 is slidably supported by a pair of guide rails 21 (in addition to the illustrated guide rail 21, another guide rail of the same shape (not illustrated) is mounted in the back) horizontally mounted on the slide table 12. Each of the guide rails 21 is mounted in the X-axis direction orthogonally to the Y-axis direction in which the slide table 12 slides. In the intermediate position between both the guide rails 21, a ball screw 22 is mounted in parallel with each of the guide rails 21. This ball screw 22 is rotatively driven by a motor 23 in either direction, forward or reverse.

On the ball screw 22, a ball nut 24 is threadably mounted. The ball screw 24 is mounted non-rotatably and integrally on the pedestal 19 so as to move in either direction, forward or reverse, along the ball screw 22 when the ball screw 22 rotates forwardly or reversely. Accordingly, the pedestal 19 slides in the X-axis direction along each of the guide rails 21. Therefore, these components compose an X-axis drive mechanism.

On the pedestal 19, a table 26 on which a substrate G to be scribed and broken is horizontally mounted. On the table 26, the substrate G is locked with, for example, a suction chuck.

On the table 26, a reference mounting position (not illustrated) related to the X-axis direction is fixed so that the substrate G precisely mounted in the reference mounting position can be precisely moved in either direction, X-axis or Y-axis, by the above slide mechanisms (X-axis drive mechanism, and Y-axis drive mechanism).

On the table 26, a scribe head 31 is located at an appropriate distance from the surface of the table 26. The scribe head 31 is supported horizontally and movably upward or downward by an up/down moving mechanism (not illustrated) at the bottom of an optical holder 33 vertically located. The upper end part of the optical holder 33 is mounted to the bottom surface of a mounting bracket 33 provided on the chassis 11. On the mounting bracket 32, a laser oscillator 34 for oscillating a laser beam (e.g., $CO_2$ laser, semi-conductor laser (e.g., YAG laser)) is mounted so that the substrate G can be irradiated with a laser beam oscillated by the laser oscillator 34 through a lens optical system 35 supported within the optical holder 33.

The lens optical system 35 uses, for example, a cylindrical lens so that an oval laser spot having the major axis direction can be irradiated to the substrate G.

The major axis direction of the laser spot formed at this time is adjusted to the X-axis direction, i.e., the direction in which the pedestal 19 is moved by the ball screw 22, the motor 23 and the ball nut 24.

Accordingly, the M-substrate G precisely mounted in the reference mounting position of the table 26 is so set as to have the scribing and breaking direction (the crack formation direction) of M-substrate G oriented to the major axis direction of the laser spot (the X-axis direction).

At an end of the scribe head 31, a cooling unit 40 is installed. The cooling unit 40 is composed of a nozzle 42 for emitting a jet of refrigerant (e.g., helium gas, $N_2$ gas, $CO_2$ gas) supplied from a refrigerant source 41 and thereby forming the cooling spot C, a nozzle X-axis adjustment (drive) mechanism 43 for moving the position of the nozzle 42 in the X-axis direction, and a nozzle Y-axis adjustment (drive) mechanism 44 for moving the position of the nozzle 42 in the Y-axis direction. It is so arranged that when these nozzle X-axis adjustment mechanism 43 and Y-axis adjustment mechanism 44 are used, the position of the cooling spot relative to a beam spot can be adjusted within the X-Y plane. However, it may also be so arranged that the X-axis direction is fixed and the adjustment is enabled only in the Y-axis direction.

On the other end of the scribe head 31, which is on the opposite side to the side installed with the cooling unit 40, a trigger formation unit 45 for forming a trigger at an edge of the plane (e.g., cutter wheel) and a trigger adjustment mechanism 45 for moving the position of the trigger formation unit 45 are installed. Although it is preferable that this trigger adjustment mechanism 46 can adjust the position of the trigger formation unit 45 in either direction, X-axis or Y-axis, it is acceptable that the trigger adjustment mechanism 46 can adjust the position of trigger formation unit 45 at least in the Y-axis direction.

The nozzle X-axis adjustment mechanism 43, the nozzle Y-axis adjustment mechanism 44 and the trigger adjustment mechanism 46 may have a simple drive mechanism using a stepping motor like one commercially available but the detail description thereof is omitted here.

According to the above composition, a Y-axis drive mechanism composed of the slide table 12, the ball screw 13, the motor (not illustrated) for rotating the ball screw 13 and the ball nut 16, and an X-axis drive mechanism composed of the pedestal 19, the ball screw 22, the motor 23 and the ball nut 24 function together as a beam spot drive unit for driving a beam spot irradiated from the scribe head 31 to the M-substrate G.

Also, the Y-axis drive mechanism composed of the slide table 12, the ball screw 13, the motor (not illustrated) for rotating the ball screw 13 and the ball nut 16, and the X-axis drive mechanism composed of the pedestal 19, the ball screw 22, the motor 23 and the ball nut 24 function together as a cooling spot drive unit for driving the cooling spot formed by a jet of refrigerant emitted from the nozzle 42 mounted on the scribe head 31 to the M-substrate G in any direction within the X-Y plain.

As described above, since the X-axis drive mechanism and the Y-axis drive mechanism functioning as the beam spot drive unit and also as the cooling spot drive unit with the same drive mechanism, when these drive mechanisms are operated, both the beam spot and the cooling spot can move in interlock with each other.

Furthermore, the nozzle X-axis adjustment mechanism 43 and the nozzle Y-axis adjustment mechanism 44, both installed on the scribe head 31, function together as a cooling spot position adjustment unit for adjusting the position of the cooling spot relative to the beam spot. Owing to the collaborative work of the nozzle X-axis adjustment mechanism 43 and the nozzle Y-axis adjustment mechanism 44, the nozzle 42 can be driven in any direction within the X-Y plane. Therefore, when the nozzle 42 is driven in the vertical direction to the beam travel line, the offset amount (described later) can be used as it is as the positional adjustment distance of the nozzle 42.

On both sides of the optical holder 33, a position read mechanism composed of CCD cameras 38 and 39 for photographing alignment marks formed inside the M-substrate G and recognizing the position of the alignment marks by a so-called image recognition method. Owing to this position read mechanism, any positional deviation amount of the M-substrate G mounted on the table 26 can be obtained.

For the reference purpose only, images photographed by the CCD cameras 38 and 39 can be displayed on monitors 48 and 49, respectively, so that the positional deviation amount can be visibly confirmed.

(Control System)

Now, description will be given to a control system for controlling the operation of the crack-forming apparatus 10. A control unit 50 and an offset amount memory unit 62 are a CPU and a memory, respectively, composing partly of a computer system for control. This computer system controls various operations of the entire apparatus by utilizing application software for forming cracks and inputted setting parameters.

Figure 2:
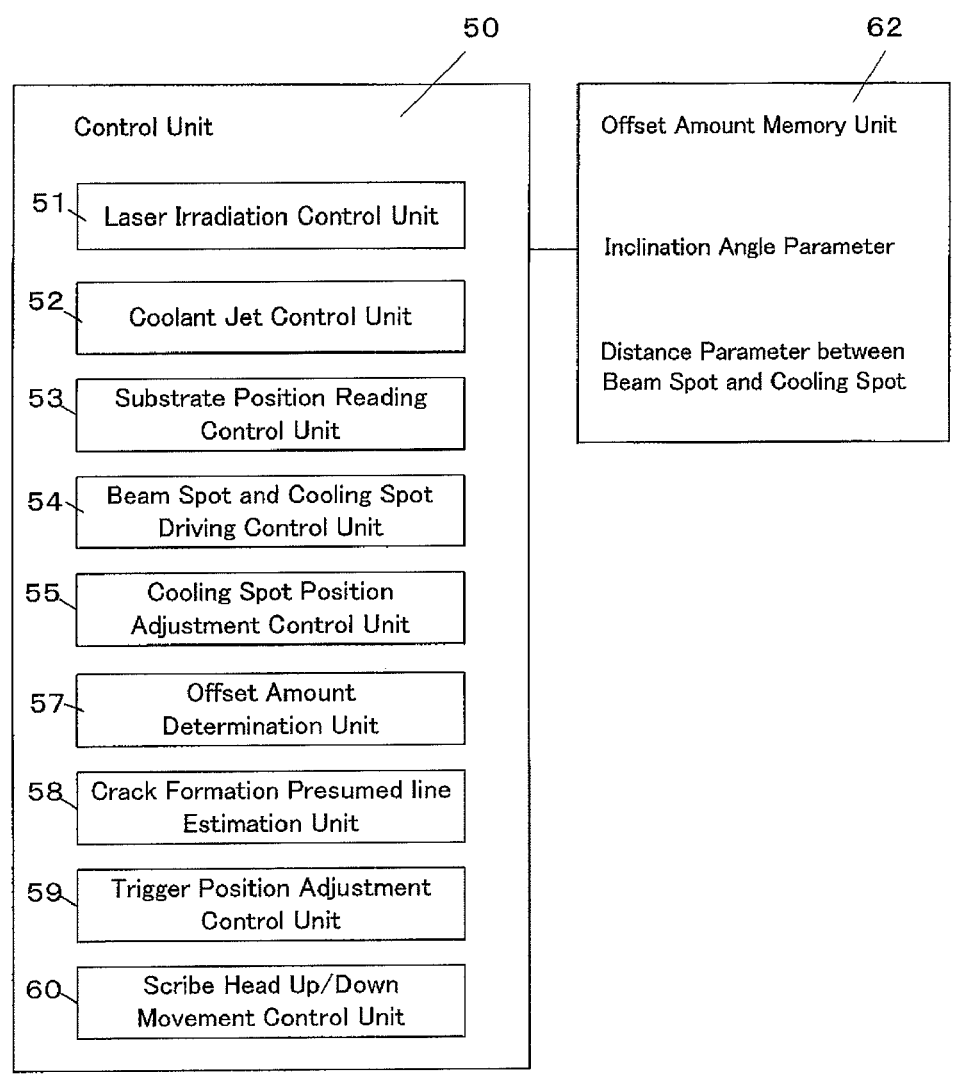
FIG. 2 is a functional block diagram depicting a control unit of the crack-forming apparatus according to an embodiment of the present invention.

FIG. 2 is a functional block diagram depicting in detail each function of various control operations of the control unit 50 and offset amount memory unit 62.

The control unit 50 is composed of a laser irradiation control unit 51, a refrigerant jet emission control unit 52, a substrate position reading control unit 53, a beam spot and cooling spot drive control unit 54, a cooling spot position adjustment control unit 55, an offset amount determination unit 57, a cooling spot position adjustment amount determination unit (crack formation presumed line estimation unit) 58, a trigger position adjustment control unit 59 and a scribe head up/down movement control unit 60.

When heating the M-substrate G, the laser irradiation control unit 51 controls the operation for driving the laser oscillator 34 to form the beam spot B on the M-substrate G.

When cooling the M-substrate G, the refrigerant jet emission control unit 52 controls the operation for emitting a jet of refrigerant from the refrigerant source 41 to form the cooling spot C on the M-substrate G.

The substrate position reading control unit 53 controls the operation for reading the alignment marks formed inside the M-substrate G by using the position read mechanism 37 and the image recognition method and thereby detecting the positional deviation of the M-substrate G.

The beam spot and cooling spot drive control unit 54 controls the operation for relatively moving the beam spot B and the cooling spot C in any direction with reference to the X-axis direction, which is the major axis direction (reference axis direction) of the beam spot B, on the M-substrate G by driving the motor 23a (not illustrated) for rotating the ball screw 13 and the motor 23 for rotating the ball screw 22.

The cooling spot position adjustment control unit 55 controls the operation for moving the position of the cooling spot C relative to the beam spot B by driving the nozzle X-axis adjustment mechanism 43 and the nozzle Y-axis adjustment mechanism 44.

At this time, by adjusting the position of the nozzle 42 so as to change the position of the cooling spot C in the vertical direction to the beam travel line by using the collaborative work of the nozzle X-axis adjustment mechanism 43 and nozzle Y-axis adjustment mechanism 44, the offset amount determined by the offset amount determination unit (described later) can be used as it is as the positional adjustment amount of the cooling spot C.

After the substrate G is set, the offset amount determination unit 57 determines the offset amount according to the positional deviation amount in the Y-axis direction by referring to the offset amount memory unit 62. Specifically, the substrate position reading control unit 53 detects this positional deviation and the offset amount determination unit 57 determines the offset amount based on the remaining positional deviation amount.

In the offset amount memory unit 62, to which the offset amount determination unit 57 refers at this time, the relation between the two parameters of the angle of inclination θ (angle between the beam travel line L and the major axis (reference axis, X-axis) of the beam spot B) and the distances between the beam spot B and the cooling spot C and the offset amount is stored in a form of database as shown in FIG. 3.

The example of the relation between the parameters and the offset amount in FIG. 3 shows the data applicable to a case where a scribe line is formed on a bonded substrate of 0.7 mm in thickness, 360×460 mm in dimensions and made of non-alkali glass by using a beam spot of 2×60 mm in axis dimensions.

Therefore, if the conditions differ from the above, the applicable data will also differ.

The data was obtained by experimentally varying each parameter beforehand. Then, based on the angle of inclination θ obtained by simple arithmetic operation using trigonometric function from the positional deviation amount and the distance between the beam spot B and the cooling spot C set beforehand and by referring to the data in the offset amount memory unit 51, the offset amount is determined.

When the distance between the beam spot B and the cooling spot C is not varied, only the angle of inclination θ is required for memorization as a parameter. On the contrary, when any parameter other than the distance between the beam spot B and the cooling spot C should be added according to the necessity, such parameter can be stored in the offset amount memory unit 51.

The cooling spot position adjustment determination unit (crack formation presumed line estimation unit) 58 estimates a line drawn following the position shifted by the offset amount determined by the offset amount determination unit 57 from the beam travel line L as the crack formation presumed line M, following which the cooling spot C should be moved.

The trigger position adjustment control unit 59 controls the moving operation for positioning the trigger formation unit 45 on the crack formation presumed line M by driving the trigger adjustment mechanism 46.

The scribe head up/down movement control unit 60 controls the operation for moving up/down the trigger formation unit 45 by moving up/down the scribe head 31. Specifically, the scribe head up/down movement control unit 60 controls the operation for forming a trigger only at an edge of the M-substrate G by approximating the trigger formation unit 45 to the edge of the M-substrate G with the scribe head 31 in the lowered position, forming a trigger at the edge of the M-substrate G and moving up the trigger formation unit 45 immediately after then to be separate from the M-substrate G.

(Example of Operation)

Now, an example of the operation when a crack-forming apparatus according to the present invention is applied to linear interpolation operation, will be described.

Figure 4:
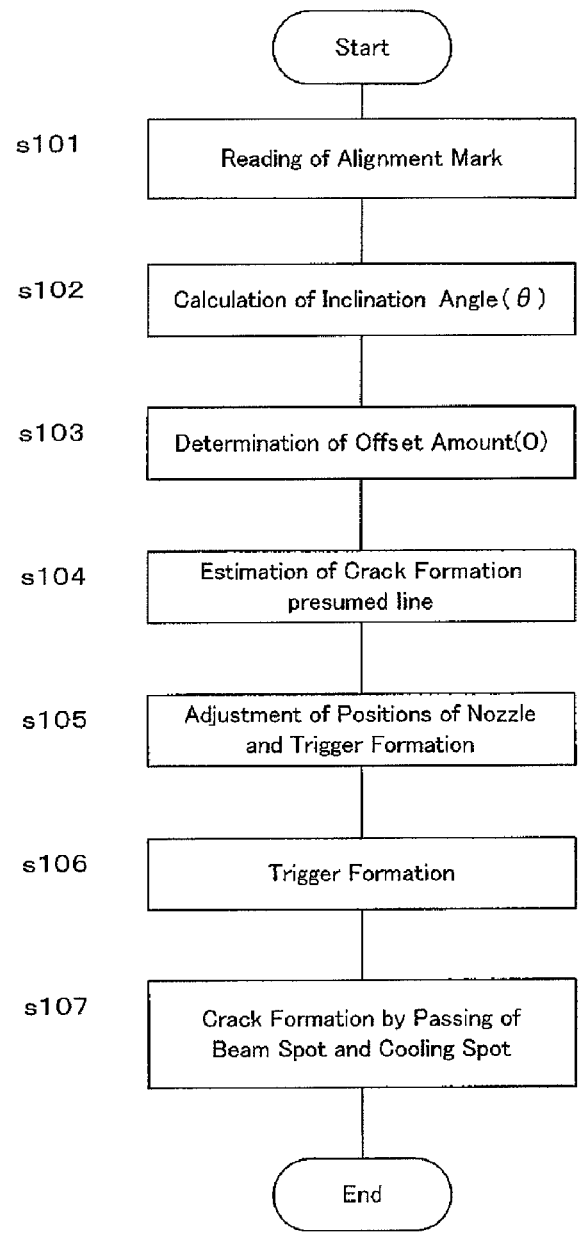
FIG. 4 is a flow chart illustrating the operation flow of the crack-forming apparatus according to an embodiment of the present invention.
Figure 5:
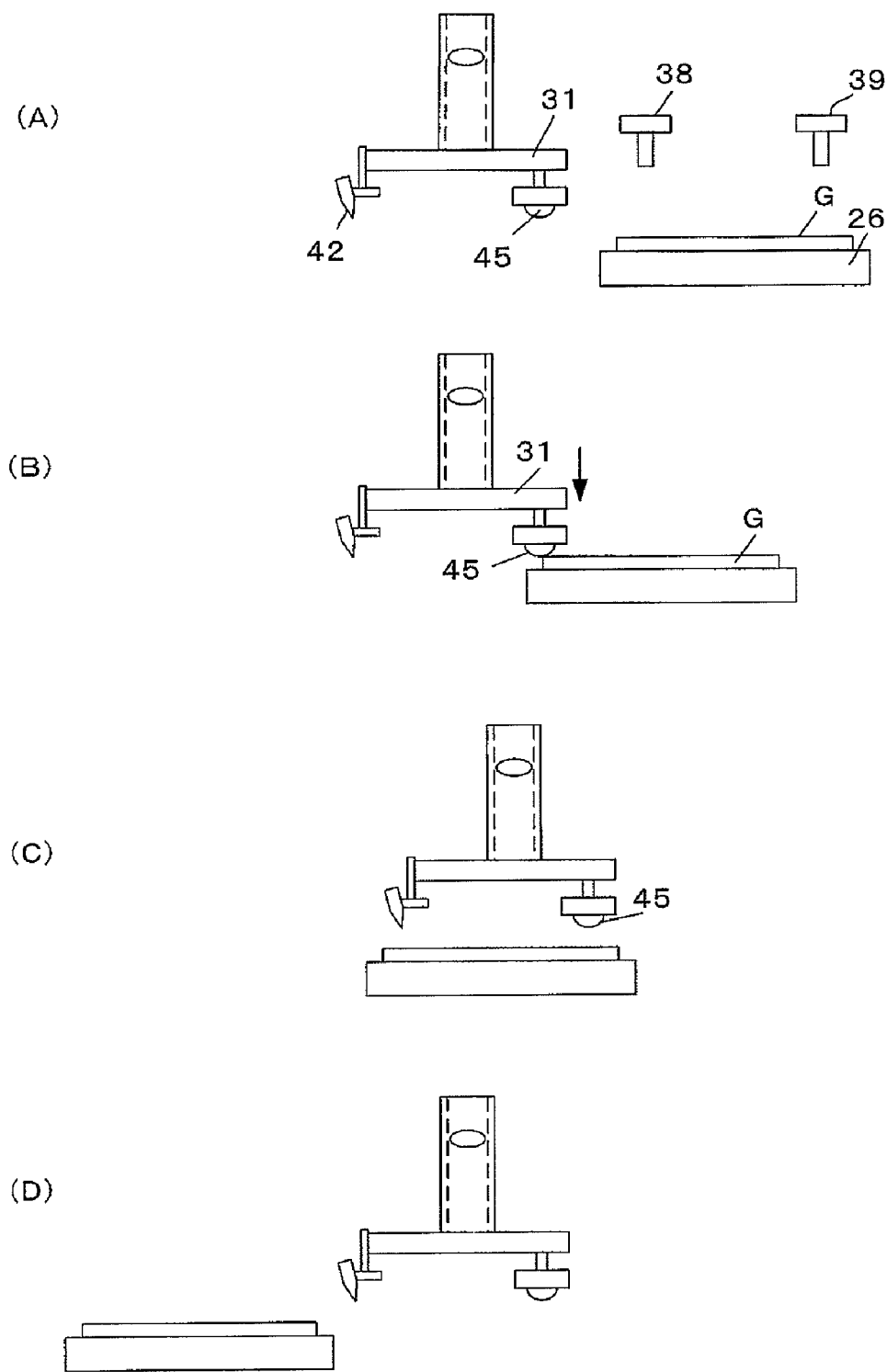
FIG. 5 is a schematic view illustrating the operational state of each process (states (A) through (D)) of crack forming operation of the crack-forming apparatus according to an embodiment of the present invention.

FIG. 4 is a flow chart illustrating the operation flow of a crack-forming apparatus according to an embodiment of the present invention, for scribing and breaking a substrate provided with alignment marks. FIG. 5 is a schematic view illustrating the operational state of each process (states (A) through (D)).

Figure 11:
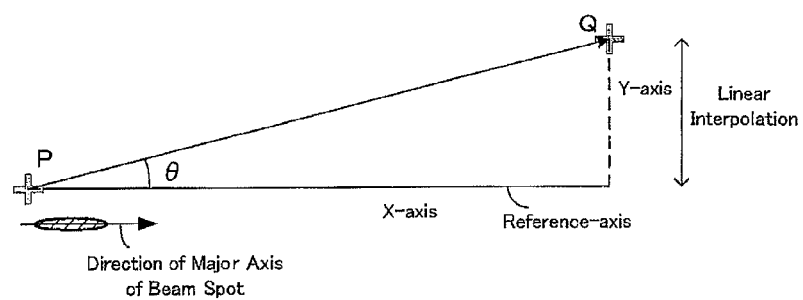
FIG. 11 is a schematic view depicting the measurement and interpolation of positional deviation of an alignment marks marked inside a substrate.
Figure 12:
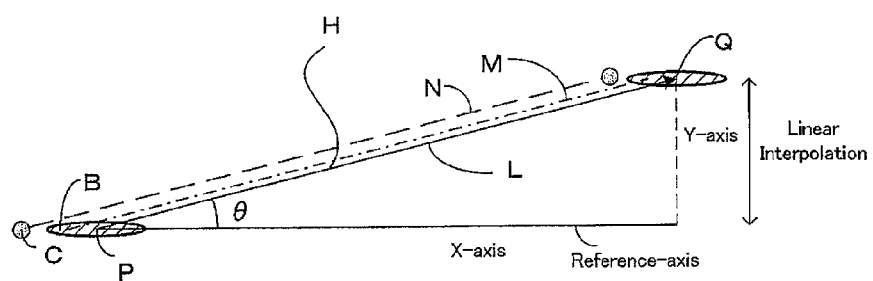
FIG. 12 is a schematic view depicting the movement state of a beam spot for a case of a beam spot having the major axis direction.
Figure 13:
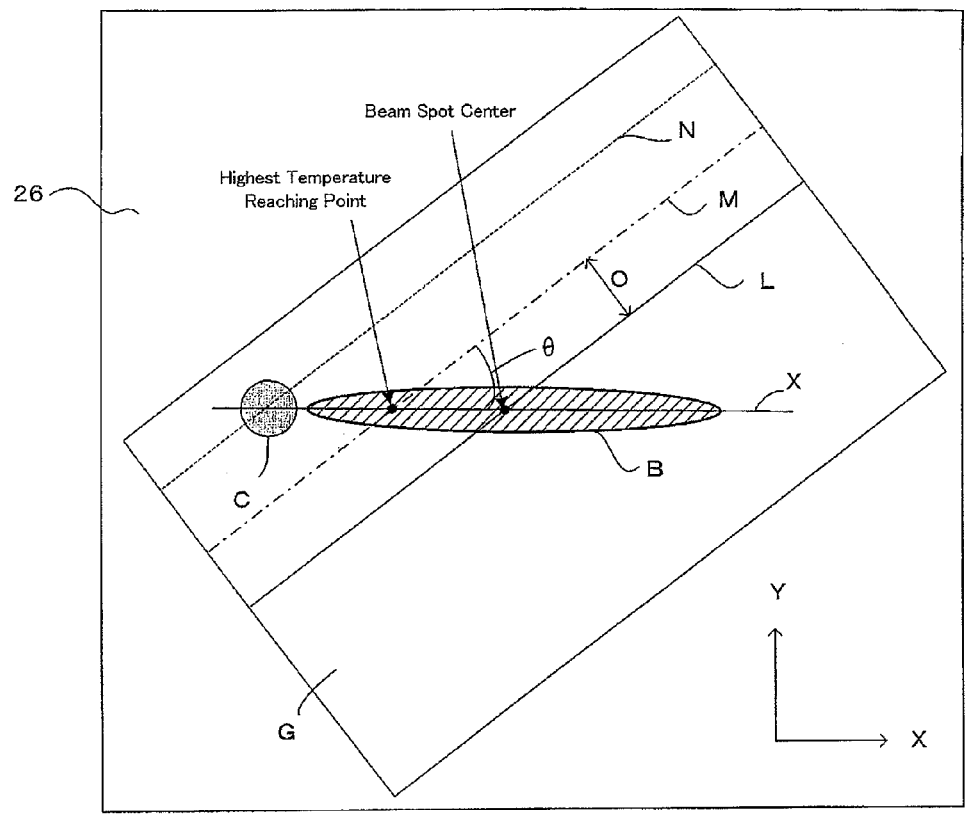
FIG. 13 is a schematic view depicting for the beam spot having the major axis direction, the relation of the beam travel line with the crack formation presumed line and with the major axis direction (reference axis direction)
Figure 14:
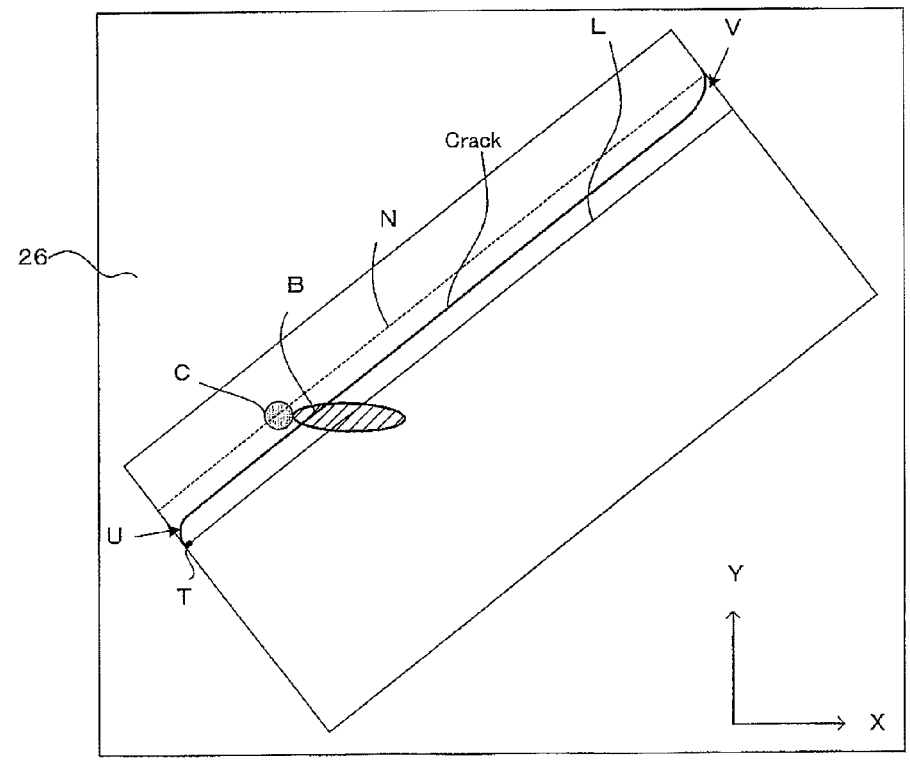
FIG. 14 is a schematic view depicting the state of a crack formed in a substrate by using a conventional crack-forming apparatus.

In the state shown in FIG. 5 (A), the alignment marks on the substrate G are read by using a position reading mechanism 37 (s101). Then, the positional deviation amount in the Y-axis direction (linear interpolation value of FIG. 11) is read.

Based on the read positional deviation amount (linear interpolation value), the linear direction connecting the alignment marks P and Q is determined as the direction of the beam travel line L, and then the angle (angle of inclination θ) between the beam travel line L and the major axis (reference axis, X-axis) of the beam spot B is obtained (s.102).

By using the obtained angle of inclination θ as a parameter (or including the distance between the beam spot B and the cooling spot C as parameters) and referring to the offset amount memory unit 62, the offset amount O is determined (s103). Then, the position shifted from the beam travel line L by the offset amount is estimated as the crack formation presumed line M (s104).

Figure 6:
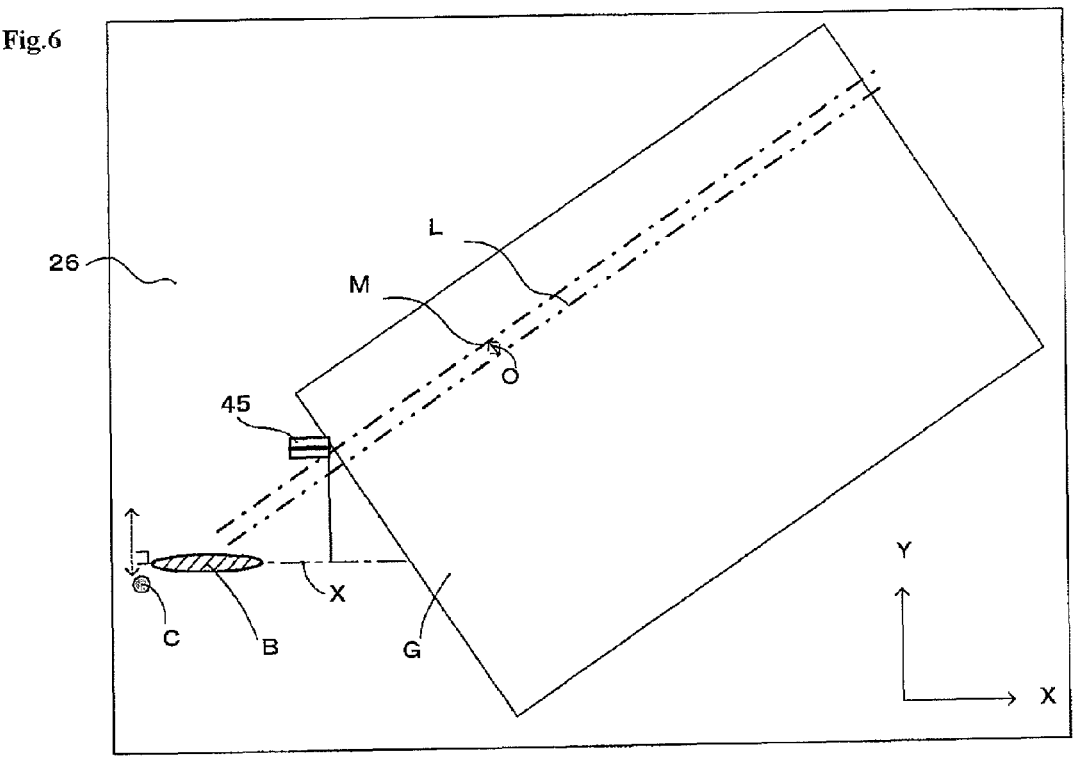
FIG. 6 is a schematic view depicting the positional relation among a trigger, a beam spot and a cooling spot relatively to a substrate in the state (B) of the crack-forming apparatus according to an embodiment of the present invention.

Then, the position of the cooling unit 40 is adjusted in such a way that the cooling spot C can move along the estimated crack formation presumed line M (at this time, it is preferable that the cooling spot C should move in vertical direction to the beam travel line L as shown in FIG. 6) by using the nozzle X-axis adjustment mechanism 43 and the nozzle Y-axis adjustment mechanism 44. Then, the position of the cooling unit 40 is adjusted in such a way that the trigger formation unit 45 can be positioned on the estimated crack formation presumed line by using the trigger adjustment mechanism 46 (s105).

Then, in the state shown in FIG. 5(B), the scribe head 31 is lowered by the scribe head up/down movement control unit 60 to have the trigger formation unit 45 in contact with the substrate G and form a trigger at an edge of the substrate G.

FIG. 6 is a schematic view depicting the positional relation among the beam spot B, the cooling spot C and the trigger formation unit 45 relatively to an M-substrate in the state (B). The estimated crack formation presumed line M is in the position separated from the beam travel line L, which is the track of the major axis center of the beam spot B passing through, by the offset amount O, and the trigger formation unit 45 is in the position at an edge of the substrate G, through which the crack formation presumed line M is passing. Furthermore, it is so arranged that the cooling spot C is positioned on the posterior continuation of the crack formation presumed line M.

Then, in the state shown in FIG. 5(C), so that the scribe head up/down movement control unit 60 can move up the scribe head 31 after the formation of a trigger T at an edge of the substrate G, the beam spot B can move across the M-substrate G following the beam travel line L, and the cooling spot C can move across the substrate G following the estimated crack formation presumed line M, the motor 23*a* (not illustrated) for rotating the ball screw 13 and the motor 23 for rotating the ball screw 22 are driven (s107). According to this arrangement, a vertical crack can be formed following the crack formation presumed line M on which the cooling spot C has moved.

Figure 7:
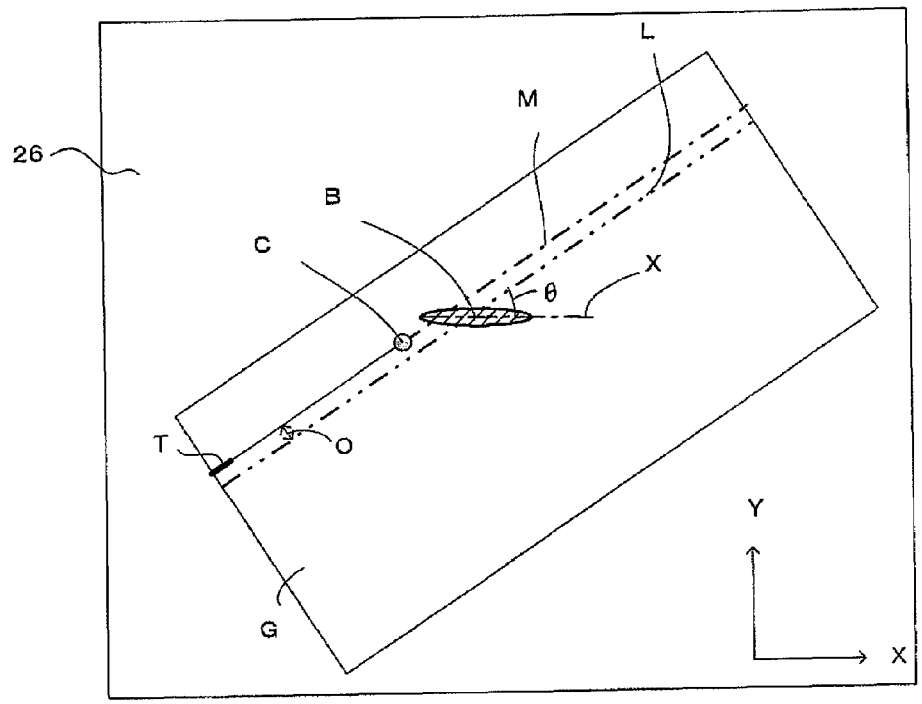
FIG. 7 is a schematic view depicting the positional relation among the trigger, the beam spot and the cooling spot relatively to the substrate in the state (C) of the crack-forming apparatus according to an embodiment of the present invention.
Figure 8:
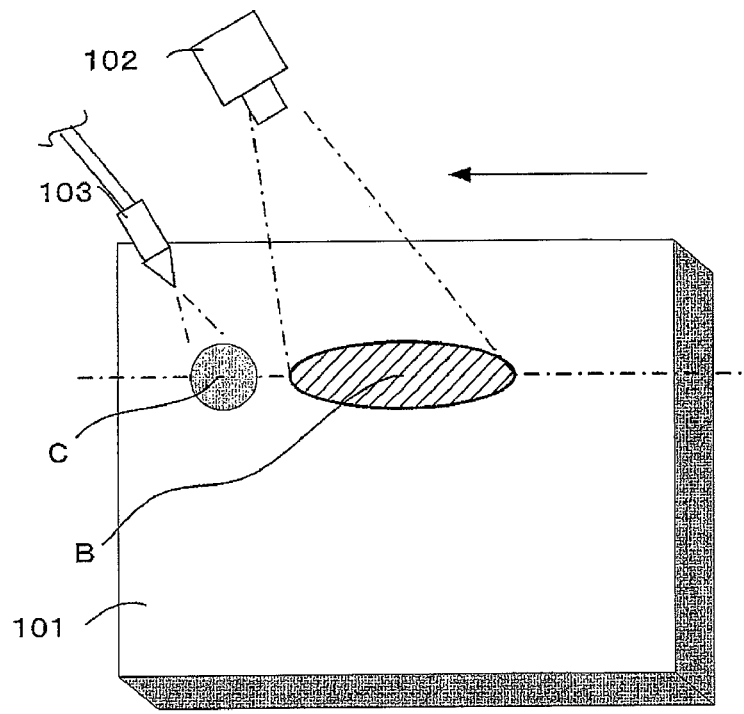
FIG. 8 is a schematic view depicting the operation of a conventional crack-forming apparatus.
Figure 9:
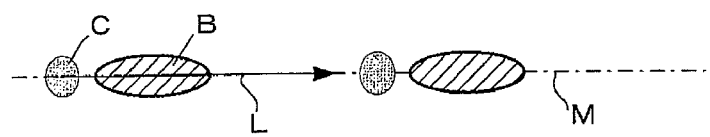
FIG. 9 is a schematic view depicting the positional relation between a beam spot and a cooling spot of the conventional crack-forming apparatus.
Figure 10:
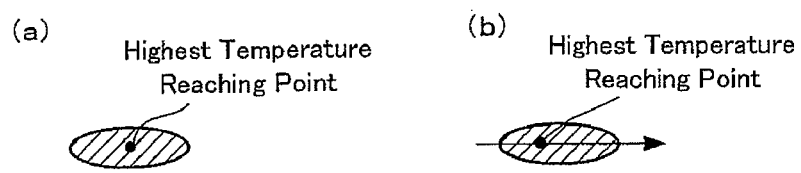
FIG. 10 is a schematic view depicting the heating peak position of a beam spot at a stop and a beam spot on the move.

FIG. 7 is a schematic view depicting the positional relation between the beam spot B and the cooling spot C when the beam spot B and the cooling spot C move through the center part of the substrate G in the state (C).

In the same way as FIG. 6, the cooling spot C is in the position separated from the beam travel line L by the offset amount O (the position on the crack formation presumed line M), off the posterior continuation of the major axis (X-axis) of the beam spot B. The cooling spot C moves across the substrate G as if passing through along the crack formation presumed line M.

Then, in the state shown in FIG. 5 (D), the beam spot B and the cooling spot C completely move across the substrate G, and a series of operation ends.

As a result of the above series of operation, the trigger T serving as the start point of a crack is formed on the estimated crack formation presumed line M. Furthermore, when the cooling spot C moves following the estimated crack formation presumed line M, a vertical crack linear across the M-substrate G is formed.

In the above example of operation, when the beam spot B moves through the center part of the M-substrate G, the cooling spot C is positioned on the crack formation presumed line M. However, when the beam spot B moves through the edge part of the M-substrate G, since the position of the major axis center of the beam spot B is decisive to the position of formation of a crack, the position of the cooling spot C may not always be positioned on the crack formation presumed line M.

(Another Example of Operation)

According to the above example of operation, it is so arranged that a crack is formed linearly between the alignment marks P and Q. However, it may also be so arranged that by consecutively changing the angle (angle of inclination θ) of the beam travel line L to the major axis (reference axis) of the beam sport B, a crack is formed following a curved shape. In this case, since the angle of inclination θ varies, the offset amount O is consecutively obtained according to the angle of inclination θ, and the crack formation presumed line M is estimated based on the offset amount O. Then, the cooling spot C is moved along the crack formation presumed line M. As a result, a vertical crack can be formed following a desired curved shape.

According to the above embodiment, the drive mechanism for driving the table 26 on which the M-substrate G is mounted, in two directions, X-axis and Y-axis. However, it may also be so arranged that a drive mechanism for driving the scribe head 31 mounted on the mounting base 32 in the X-axis direction and the table 26, on which the substrate G is mounted, in the Y-axis direction.

Figure 15:
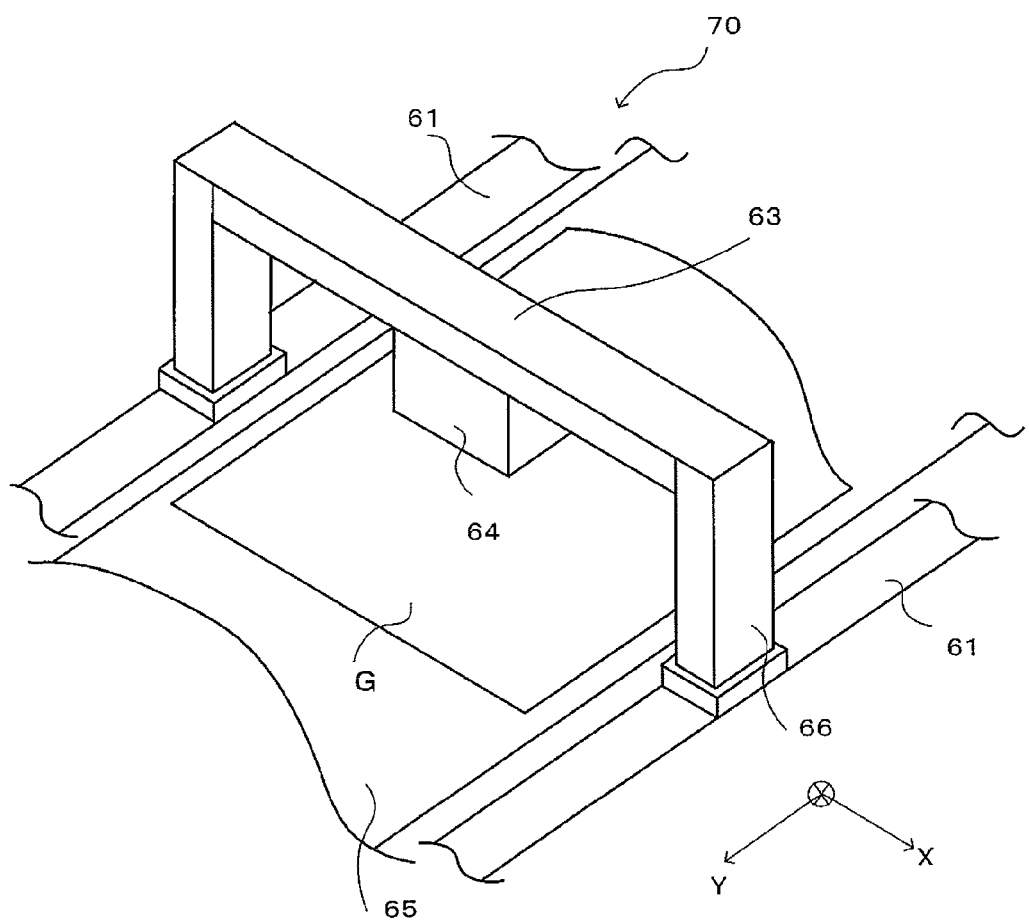
FIG. 15 is a schematic view depicting the composition of a crack-forming apparatus according to another embodiment of the present invention.
Figure 16:
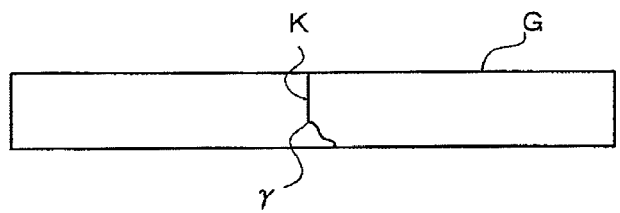
FIG. 16 is a schematic view depicting "flare" caused when a crack is being formed in a substrate.
Figure 17:
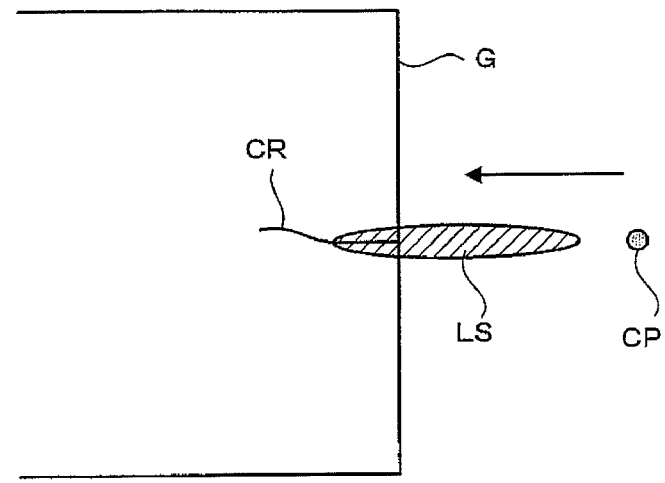
FIG. 17 is a schematic view depicting "hasty cutting" caused when a crack is being formed in a substrate.
Figure 17:
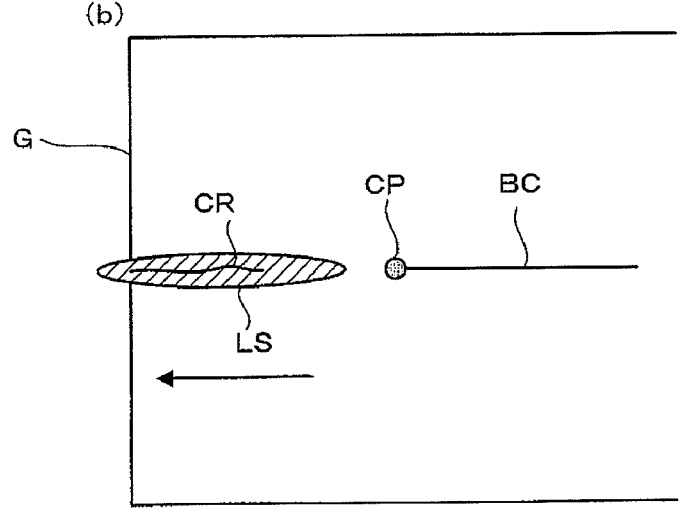

FIG. 15 shows a crack-forming apparatus according to another embodiment of the present invention.

In FIG. 15, a crack-forming apparatus 70 comprises a bridge 66 movable in the Y-axis direction shown in this figure along a rail 61 locked on a chassis (not illustrated) and a scribe head 64 movable in the X-axis direction shown in this figure along a main body 63 of the bridge 66. Under the scribe head 64, a table 65 capable of moving the substrate G in the Y-direction as shown in this figure is provided.

The crack-forming apparatus 70 comprises a control unit 50 and an offset amount memory unit 62 in the same way as the above crack-forming apparatus 10 does.

When the table 65 moves the substrate G in the Y-direction shown in this figure, the substrate G is scribed and broken to a desired length while the speed at which the bridge 66 moves in the Y-direction shown in this figure along the rail 61 and the speed at which the scribe head 64 moves in the X-direction shown in this figure along the main body 63 of the bridge 66 are being controlled.

At this time, according to the arrangement of the crack-forming apparatus 70, the scribe head 64 performs linear interpolation operation by using the control unit 50 in the same way as the crack-forming apparatus 10 does. Specifically, while the cooling spot C is being relatively moved following the crack formation presumed line M, the beam spot B and the substrate G are relatively moved in such a way that beam travel line L can be in an oblique direction to the major axis (reference axis) of the beam spot B, and thereby the substrate G can be scribed and broken into a rectangular shape with the four right-angled corner and the four linear sides, for example. On the other hand, by forming a trigger at an end of the crack formation presumed line M, the position in which a crack is formed and the crack formation presumed line M are coincident with each other, and thereby a defect, such as "flare" and "hasty cutting," which is likely to occur at the start or end point of scribe, i.e., at the edge part of the substrate G, can be prevented.

FIELD OF USABILITY IN INDUSTRY

The present invention can be used for the manufacture of crack-forming apparatuses which can precisely form a crack in substrates made of brittle materials, and specifically can be used for processing flat display panels made of brittle materials, including liquid crystal panels, plasma display panels and organic EL display substrates, and also for processing substrates made of brittle materials, including ceramic capacitors and semiconductor chips.

The invention claimed is:

1. A method of forming a crack in substrates made of brittle materials, comprising the steps of irradiating a laser beam which can form a beam spot substantially having the major axis to a substrate, forming a cooling spot by emitting a jet of refrigerant to the substrate, and locally causing thermal stress to the substrate by heating with the irradiation of the laser beam and cooling with the emission of a jet of refrigerant, wherein the beam spot is moved relatively to said substrate in such a way that the direction of a beam travel line, which is the track of the movement of the major axis center of the beam spot, can be in an oblique direction to the reference axis direction set to be coincident with the major axis direction of the beam spot, the cooling spot is relatively moved following a crack formation presumed line in a position separated from the beam travel line by an offset amount.

2. The crack-forming method of claim 1, wherein a vertical crack is formed along the crack formation presumed line.

3. The crack-forming method of claim 1, wherein the crack formation presumed line is the track of the highest temperature reaching point formed by the beam spot.

4. The crack-forming method of claim 3, wherein a laser scribe is conducted with measuring the temperature distribution on the surface of the substrate when the laser beam moves and obtaining positional data of the highest temperature reaching point.

5. The crack-forming method of claim 1, wherein the angle of inclination between said reference axis and said beam travel line is obtained when the beam spot is moved relatively to the substrate, the position of the crack formation presumed line is estimated by determining the offset amount based on at least said angle of inclination as one of the parameters, and the position of the cooling spot is set in such a way that the cooling spot can relatively move following the crack formation presumed line or in the vicinity of the crack formation presumed line.

6. The crack-forming method of claim 5, wherein the offset amount is determined based on the distance between the beam spot and the cooling spot as a parameter in addition to said angle of inclination.

7. The crack-forming method of claim 5, wherein the position of the cooling spot is varied in the vertical direction to the beam travel line when the position of the cooling spot is set.

8. The crack-forming method of claim 1, wherein a trigger is formed beforehand to be served as the start point of a crack at an edge of the substrate on the crack formation presumed line and the beam spot is moved relatively to the substrate when the crack formation is started at an edge of the substrate.

9. The crack-forming method of claim 5, wherein a substrate mounting unit is used for mounting the substrate within a plane including said reference axis, the substrate on which alignment marks have been formed as navigation marks for the substrate position is mounted on the substrate mounting unit, the positions of said alignment marks relative to a reference mounting position related to said reference axis direction are detected, a linear interpolation value representing the positional deviation amount of the substrate from the reference axis is obtained by arithmetic operation, the direction of the beam travel line is determined based on the obtained linear interpolation value, the angle of inclination between the determined beam travel line and said reference axis is obtained by arithmetic operation, the offset amount is determined by using at least said angle of inclination as one of the parameters, and thereby the position of the crack formation presumed line separated from the beam travel line by the offset amount is estimated, and the position of the cooling spot is set in such a way that the cooling spot can relatively move following the estimated crack formation presumed line or in the vicinity of the estimated crack formation presumed line.

* * * * *